US012379533B2

(12) United States Patent
Aoki et al.

(10) Patent No.: US 12,379,533 B2
(45) Date of Patent: Aug. 5, 2025

(54) GRATING PART AND MANUFACTURING METHOD THEREOF

(71) Applicant: MITUTOYO CORPORATION, Kanagawa (JP)

(72) Inventors: Toshihiko Aoki, Kanagawa (JP); Kosaku Miyake, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 18/233,012

(22) Filed: Aug. 11, 2023

(65) Prior Publication Data

US 2023/0384495 A1    Nov. 30, 2023

Related U.S. Application Data

(62) Division of application No. 16/907,942, filed on Jun. 22, 2020, now Pat. No. 11,768,322.

(30) Foreign Application Priority Data

Jun. 28, 2019    (JP) .................................. 2019-120812

(51) Int. Cl.
G02B 5/18    (2006.01)
(52) U.S. Cl.
CPC ......... *G02B 5/1814* (2013.01); *G02B 5/1852* (2013.01); *G02B 2005/1804* (2013.01)
(58) Field of Classification Search
CPC ................ G02B 5/1814; G02B 5/1852; G02B 2005/1804; G02B 27/4272; G02B 27/4277; G02B 5/1819
USPC ................... 359/569, 576; 349/200
See application file for complete search history.

(56) References Cited

U.S. PATENT DOCUMENTS

| | | | | |
|---|---|---|---|---|
| 4,946,253 A * | 8/1990 | Kostuck | ............ | G02B 27/4261 |
| | | | | 359/638 |
| 5,258,871 A | 11/1993 | Gupta | | |
| 5,434,708 A | 7/1995 | Gupta | | |
| 5,905,571 A * | 5/1999 | Butler | ....................... | G01J 3/18 |
| | | | | 356/326 |
| 6,404,554 B1 | 6/2002 | Lee et al. | | |
| 6,728,034 B1 | 4/2004 | Nakanishi | | |
| 7,430,076 B2 * | 9/2008 | Sato | ..................... | G02B 5/1861 |
| | | | | 359/569 |

(Continued)

FOREIGN PATENT DOCUMENTS

| | | |
|---|---|---|
| JP | 2007-317326 | 12/2007 |
| JP | 2017-026567 | 2/2017 |

OTHER PUBLICATIONS

Official Communication Received in German Patent Application No. 102020003758.5, dated Nov. 2, 2020, along with an English translation thereof.

(Continued)

*Primary Examiner* — Audrey Y Chang
(74) *Attorney, Agent, or Firm* — Greenblum & Bernstein, P.L.C.

(57) ABSTRACT

A grating part includes a first transparent substrate having an optical grating on a surface thereof, a second transparent substrate having an optical grating on a surface thereof, and a spacer positioned between the first transparent substrate and the second transparent substrate, the spacer bonding the first transparent substrate and the second transparent substrate.

8 Claims, 12 Drawing Sheets

(56) References Cited

U.S. PATENT DOCUMENTS

| | | | |
|---|---|---|---|
| 7,817,176 B2* | 10/2010 | Masuda | G02B 26/124 |
| | | | 359/485.02 |
| 8,976,450 B2* | 3/2015 | Iizuka | G02B 26/02 |
| | | | 359/576 |
| 2004/0169929 A1 | 9/2004 | Sato | |
| 2007/0216851 A1* | 9/2007 | Matsumoto | G02F 1/29 |
| | | | 349/200 |
| 2015/0029588 A1 | 1/2015 | Fiorentino et al. | |
| 2015/0192713 A1 | 7/2015 | Aono | |
| 2016/0282615 A1 | 9/2016 | Yokoyama | |
| 2021/0063619 A1* | 3/2021 | Yoon | G02B 5/1842 |

OTHER PUBLICATIONS

Office Action issued in Corresponding German Patent Application No. 102020003758.5, dated Jun. 17, 2022, along with an English translation thereof.

* cited by examiner

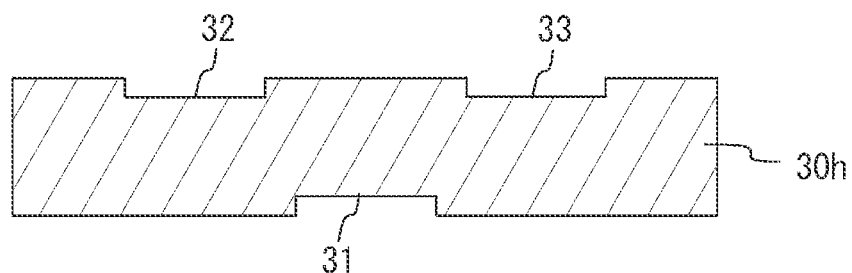
Fig. 15A
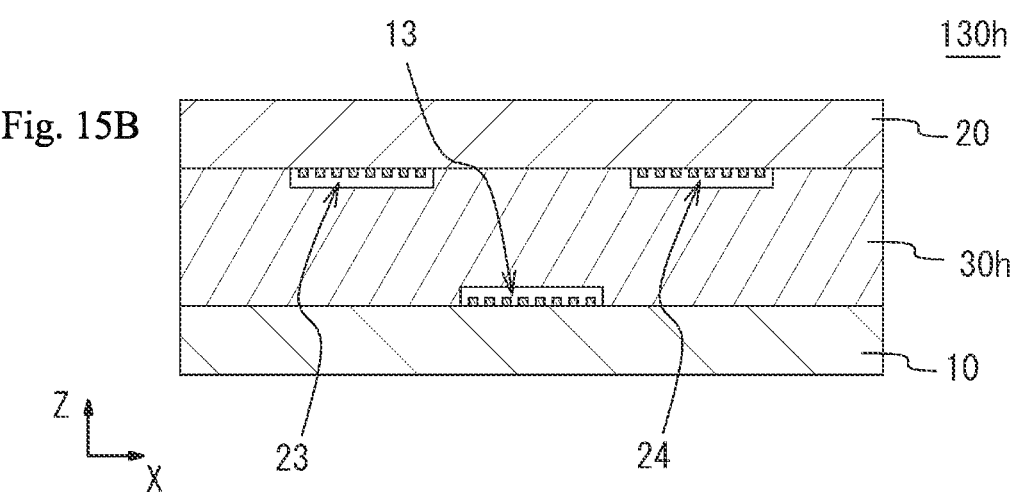
Fig. 15B
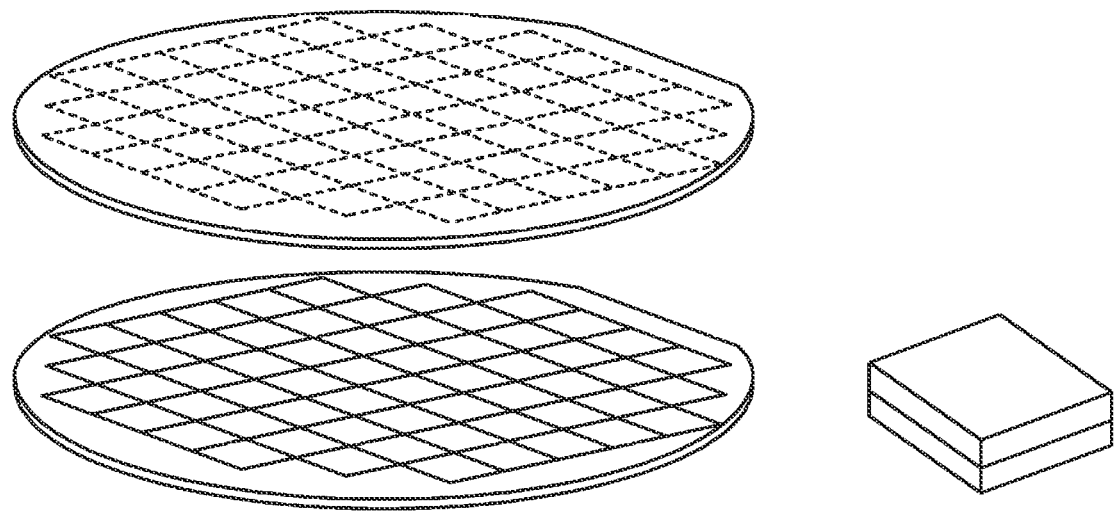
Fig. 16A
Fig. 16B

GRATING PART AND MANUFACTURING METHOD THEREOF

CROSS-REFERENCE TO RELATED APPLICATIONS

The present application is a divisional application of U.S. application Ser. No. 16/907,942, filed Jun. 22, 2020, which claims priority under 35 U.S.C. § 119 to Japanese Patent Application No. 2019-120812, filed Jun. 28, 2019. The disclosure of each of these applications is herein incorporated by reference in its entirety.

BACKGROUND OF THE INVENTION

1. Field of the Invention

The present invention relates to a grating part and its manufacturing method.

2. Description of Related Art

A reflective-type optical linear scale includes, for example, a grating part as a detecting device, the grating part having a plurality of optical diffractive gratings and amplitude gratings (see, for example, Japanese Patent Laid-open Publication No. 2017-026567).

A grating part of this type may cause variations in optical characteristics.

SUMMARY OF THE INVENTION

The present invention provides a grating part and its manufacturing method that allow variations in optical characteristics to be suppressed.

In one aspect, the grating part according to the present invention includes a first transparent substrate having an optical grating on a first principal surface, and a second transparent substrate having an optical grating on a first principal surface; a second principal surface of the first substrate on opposite side from the first principal surface and a second principal surface of the second substrate on an opposite side from the first principal surface are bonded.

In the grating part noted above, a thin film may be provided to a portion between the first substrate and the second substrate to serve as a light reflecting film or a light absorbing film.

In one aspect, the grating part according to the present invention includes a first transparent substrate having an optical grating on a surface, a second transparent substrate having an optical grating on a surface, and a spacer arranged between the first substrate and the second substrate, and the first substrate and the second substrate are bonded with the spacer.

In the grating part noted above, the spacer may form a cavity between the first substrate and the second substrate.

In the grating part noted above, the thin film may be provided inside the cavity to serve as the light reflecting film or the light absorbing film.

In the grating part noted above, the first substrate may include the optical grating inside the cavity and the second substrate may include the optical grating inside the cavity.

In the grating part noted above, the first substrate may include a recess on one principal surface with the optical grating provided in the recess, the second substrate may include a recess on one principal surface with the optical grating provided in the recess, the one principal surface of the first substrate and the one principal surface of the second substrate may be bonded with the spacer, and the optical grating of the first substrate and the optical grating of the second substrate may be covered with the spacer.

In the grating part noted above, the spacer may include a first recess on a first principal surface, and a second recess on a second principal surface on an opposite side from the first principal surface; the principal surface of the first substrate where the optical grating is provided may face the principal surface of the second substrate where the optical grating is provided; and the optical grating of the first substrate may be positioned by the first recess and the optical grating of the second substrate may be positioned by the second recess.

In one aspect, a manufacturing method of a grating part according to the present invention includes a step of bringing the first transparent substrate having the optical grating on the first principal surface into contact with the second transparent substrate having the optical grating on the first principal surface such that the second principal surface of the first substrate on an opposite side from the first principal surface faces the second principal surface of the second substrate on an opposite side from the first principal surface, and a step of bonding the second principal surface of the first substrate with the second principal surface of the second substrate by room temperature bonding, diffusion bonding, or anodic bonding.

In one aspect, the manufacturing method of the grating part according to the present invention includes a step of positioning a spacer between the first transparent substrate having the optical grating on a surface and the second transparent substrate having the optical grating on a surface, and a step of the first substrate and the second substrate are bonded with the spacer by room temperature bonding, diffusion bonding, or anodic bonding.

The present invention provides a grating part and its manufacturing method that allow variations in optical characteristics to be suppressed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 15A and 15B are exemplified views of a detecting device according to a ninth embodiment; and FIGS. 16A and 16B show an example of a bulk manufacturing using MEMS technology.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
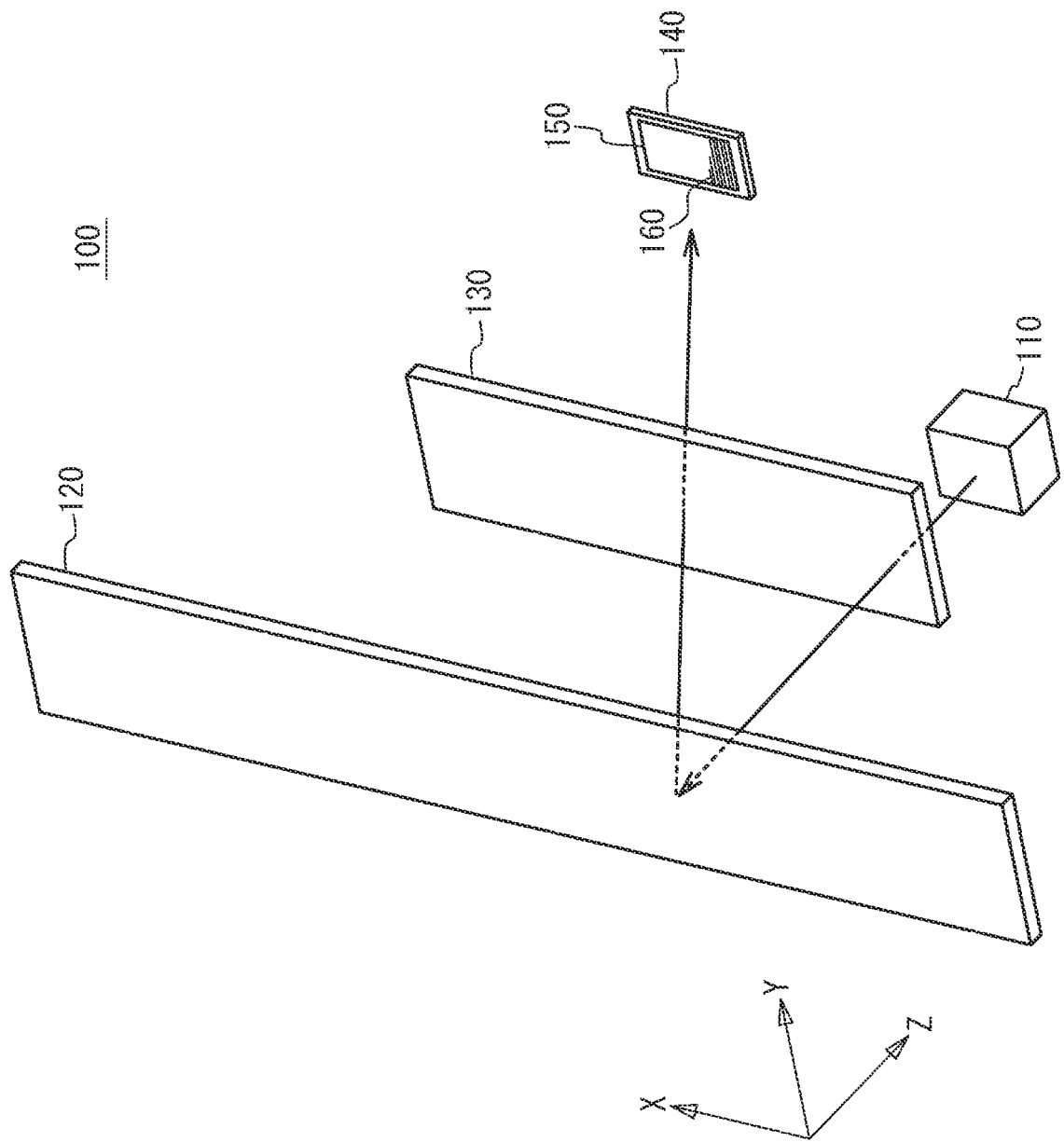
FIG. 1 is a perspective view of an optical encoder according to an embodiment.

FIG. 1 is a perspective view of an optical encoder 100 according to an embodiment. As shown in FIG. 1, the optical encoder 100 includes a collimating light source 110, a main scale 120, a detecting device 130, a photoreceiver element 140, and the like. In the description that follows, an array direction of each grating being formed on the main scale 120 is an X axis. An extending direction of each grating of the main scale 120 is a Y axis. A direction orthogonal to the X and Y axes is a Z axis. The Z axis is a direction where the main scale 120 and the detecting device 130 face each other.

The collimating light source 110 is not specifically limited as long as the light source emits collimated light. For example, the collimating light source 110 includes a light-emitting element such as a light-emitting diode, a collimating lens, and the like.

The main scale 120 includes a grating having a predetermined scale period along the X axis direction. In other words, the main scale 120 has the grating's array direction in the X axis direction. Therefore, the measurement axis of the main scale 120 is the X axis. Each grating extends in the Y axis direction. In other words, each grating has a length direction in the Y axis direction. The main scale 120 is capable of displacement in the X axis direction, relative to the collimating light source 110, the detecting device 130, and the photoreceiver element 140.

The photoreceiver element 140 is provided with a photo-receiving region 150. In the photo-receiving region 150, a plurality of photodiodes 160 are arranged so as to be aligned in the X axis direction at a predetermined period. For example, the photoreceiver element 140 is a photo diode array. The detecting device 130 is a grating part that includes gratings at a predetermined period, and forms an image, in the photo-receiving region 150 of the photoreceiver element 140, of diffracted light obtained by reflecting the light from the collimating light source 110 with the main scale 120. The photo-receiving region 150 uses output from the plurality of photodiodes 160 to detect periodic light and shade that corresponds to the grating of the main scale 120. Accordingly, a relative position fluctuation of the main scale 120 can be detected. Specifically, an amount of position fluctuation can be found based on the received light intensity detected by the plurality of the photodiodes 160.

Figure 2:
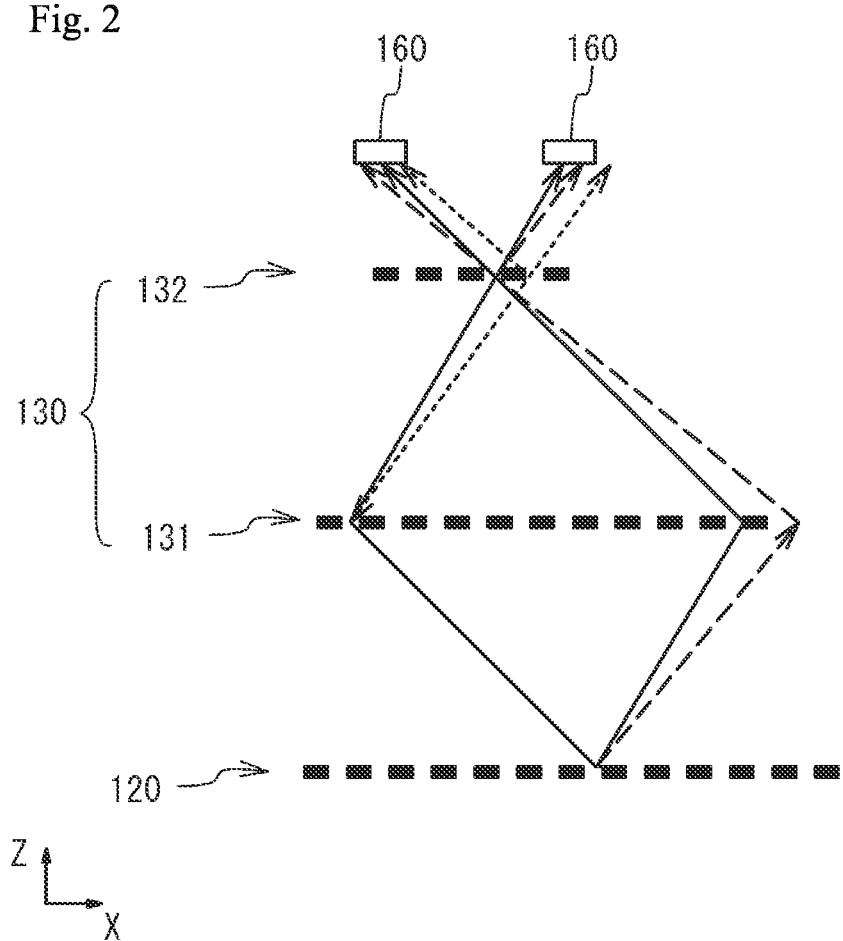
FIG. 2 illustrates examples of an optical path.

FIG. 2 illustrates examples of an optical path. As shown in FIG. 2, the detecting device 130 includes a plurality of index scales 131, 132, and so on. The index scales 131 and 132 include a grating having a predetermined scale period along the X axis direction. The light reflected by the main scale 120 passes through the index scale 131 of the detecting device 130 and further passes through the index scale 132 and forms an image on the photodiodes 160. In this way, via the plurality of index scales of the detecting device 130, the light forms an image on the photodiodes 160.

Accordingly, the detecting device 130 is a grating part having a plurality of optical diffractive gratings, a plurality of amplitude gratings, and the like. The detecting device 130 of this kind preferably strictly determines a distance and angle between the diffractive grating and the amplitude grating in order to maintain optical characteristics. At that point, when the diffractive grating is formed individually and the position is determined by bonding to a supporting member using an organic adhesive, due to influences such as a difference in thermal expansion of the supporting member and the adhesive or cure shrinkage, the relative distance between the gratings may change and variations may occur in the optical characteristics.

The detecting device 130 according to the present embodiment has a configuration that allows variations in optical characteristics to be suppressed.

Figure 3A:
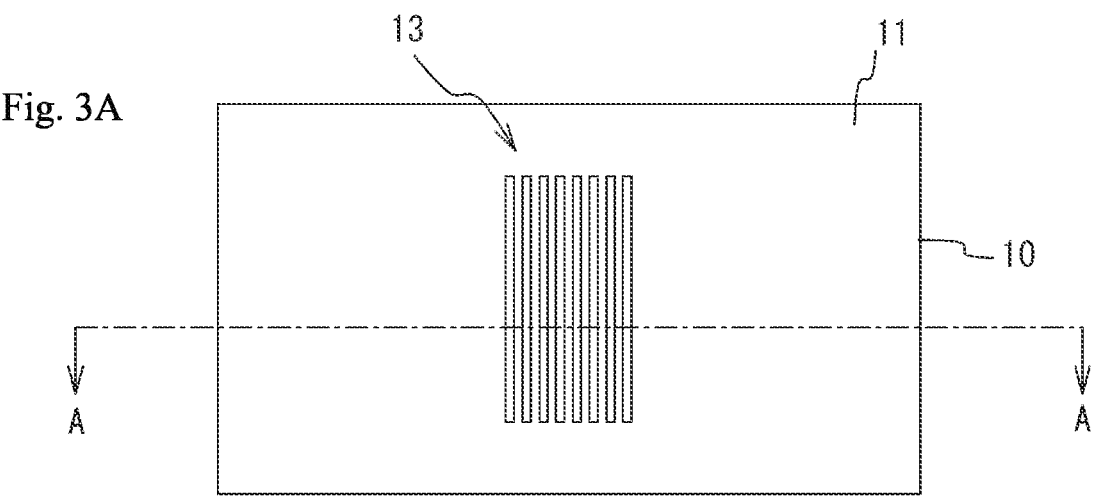
FIG. 3A is a plan view of a first substrate and FIG. 3B is a cross-sectional view along a line A-A of FIG. 3A.
Figure 3B:
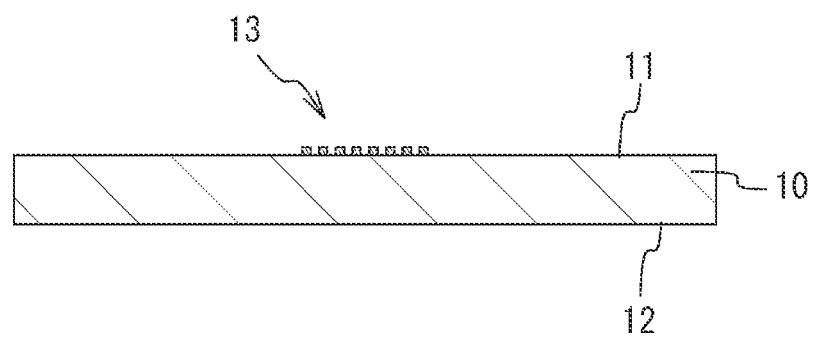

FIG. 3A is a plan view of a first substrate 10 included in the detecting device 130. FIG. 3B is a cross-sectional view of the first substrate 10 and shows a cross-sectional view along a line A-A of FIG. 3A. The first substrate 10 is a transparent substrate and is made of a material such as glass that contains synthetic silica and mobile alkali ions. The first substrate 10 includes a first principal surface 11 and a second principal surface 12 that are on opposite sides of the first substrate 10 from each other. As shown in FIGS. 3A and 3B, on the first principal surface 11 of the first substrate 10, a scale grating 13 with a plurality of gratings positioned at a predetermined interval along the measurement axis is provided as an optical grating. The first substrate 10 corresponds to the index scale 131 in FIG. 2. The scale grating 13 may have the substrate material processed as is or use an oxide thin film, a resin, or the like.

Figure 4A:
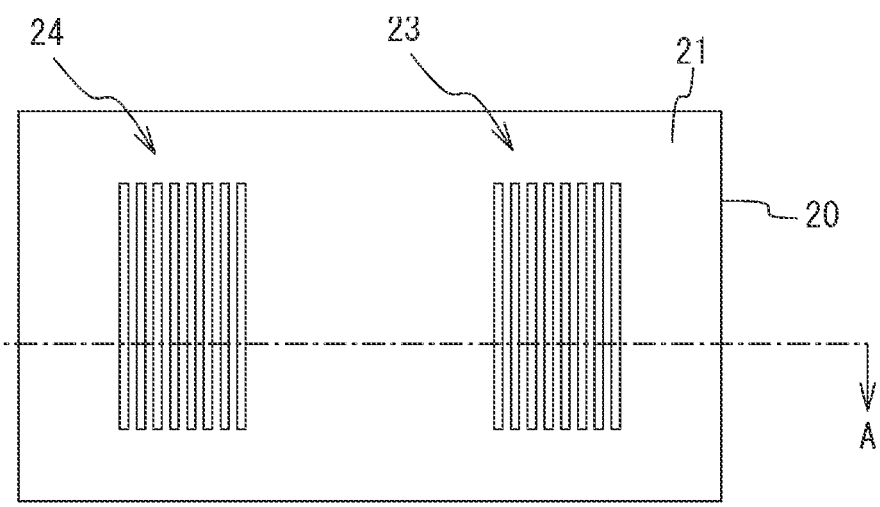
FIG. 4A is a plan view of a second substrate and FIG. 4B is a cross-sectional view along a line A-A of FIG. 4A.
Figure 4B:
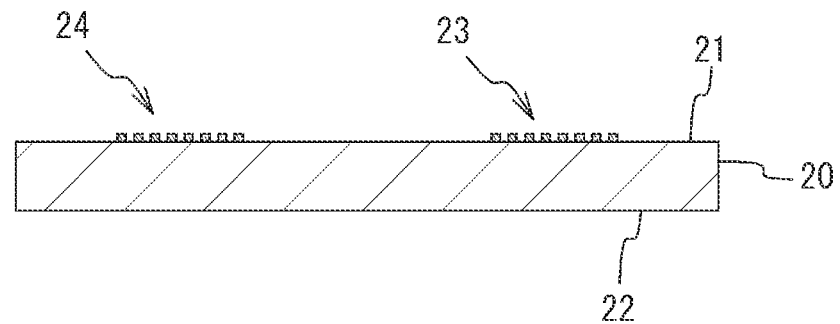

FIG. 4A is a plan view of a second substrate 20 included in the detecting device 130. FIG. 4B is a cross-sectional view of the second substrate 20 and shows a cross-sectional view along a line A-A of FIG. 4A. The second substrate 20 is a transparent substrate and is made of a material such as glass that contains synthetic silica and mobile alkali ions. The second substrate 20 includes a first principal surface 21 and a second principal surface 22 that are on opposite sides of the second substrate 20 from each other. As shown in FIGS. 4A and 4B, on the first principal surface 21 of the second substrate 20, a scale grating 23 with a plurality of gratings arranged at a predetermined interval along the measurement axis is provided as an optical grating. Also, on the first principal surface 21 of the second substrate 20, a scale grating 24 with a plurality of gratings arranged at a predetermined interval along the measurement axis is provided as an optical grating in a region separated from the scale grating 23 along the measurement axis. The second substrate 20 corresponds to the index scale 132 in FIG. 2. The scale grating 23 and the scale grating 24 may have the substrate material processed as is or use an oxide thin film, a resin, or the like.

Figure 5A:
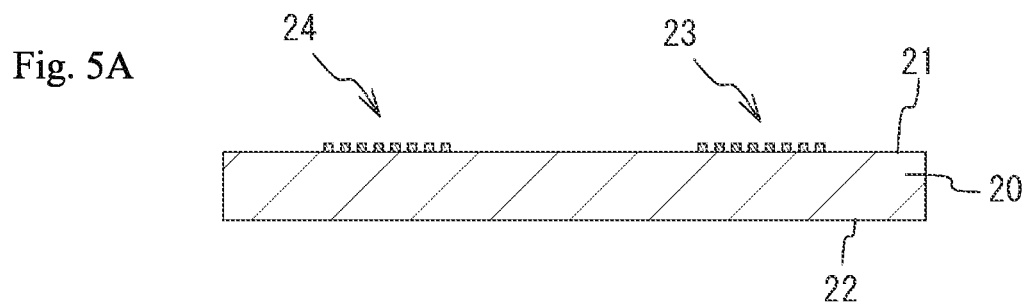
FIGS. 5A and 5B are exemplified views of bonding.
Figure 5A:
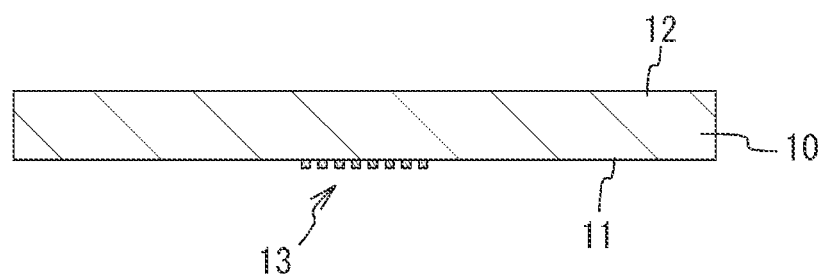
Figure 5B:
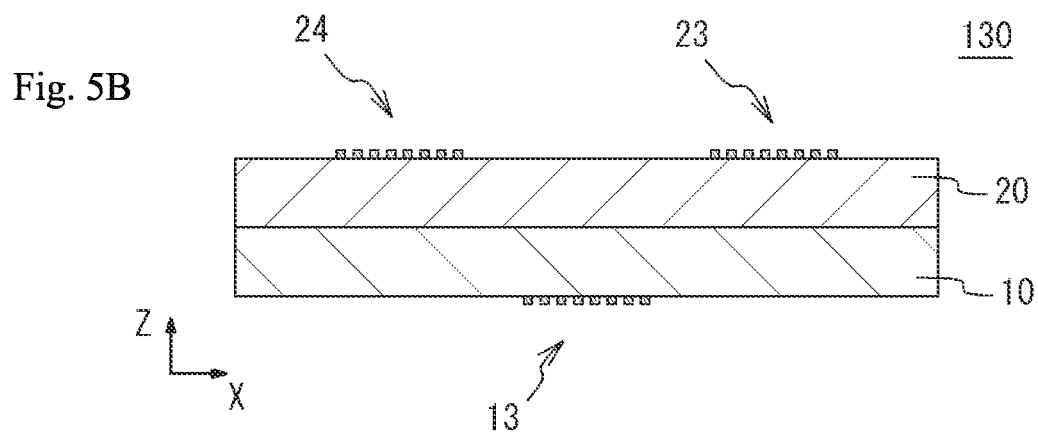

As shown in FIG. 5A, the second principal surface 12 of the first substrate 10 and the second principal surface 22 of the second substrate 20 face each other and come into contact with each other. In this case, the first substrate 10 and the second substrate 20 come into contact with each other so as to place the scale grating 13 between the scale grating 23 and the scale grating 24 in a plan view. Then, as shown in FIG. 5B, the first substrate 10 and the second substrate 20 are bonded. A method used for the bonding is room temperature bonding, diffusion bonding, or anodic bonding. An organic adhesive is not used for bonding the first substrate 10 and the second substrate 20.

A height and a width of the grating are determined from a wavelength and an incident angle of the detected light. Also, when a plurality of grating patterns are arranged on the same substrate, a relative position can be determined with an accuracy of less than 1 µm if the pattern is arranged on a photo mask in advance.

In the detecting device 130 according to the present embodiment, the first substrate 10 and the second substrate 20 are bonded without using an organic adhesive. With this configuration, there is no effect from differences between the thermal expansion of the first substrate 10 and the second substrate 20, and the thermal expansion of the organic adhesive. In addition, there is no effect from cure shrinkage of the organic adhesive and the like. Accordingly, changes in the distance between the scale grating of the first substrate 10 and the scale gratings of the second substrate 20 are suppressed. As a result, variations in the optical characteristics are suppressed.

Second Embodiment

Figure 6:
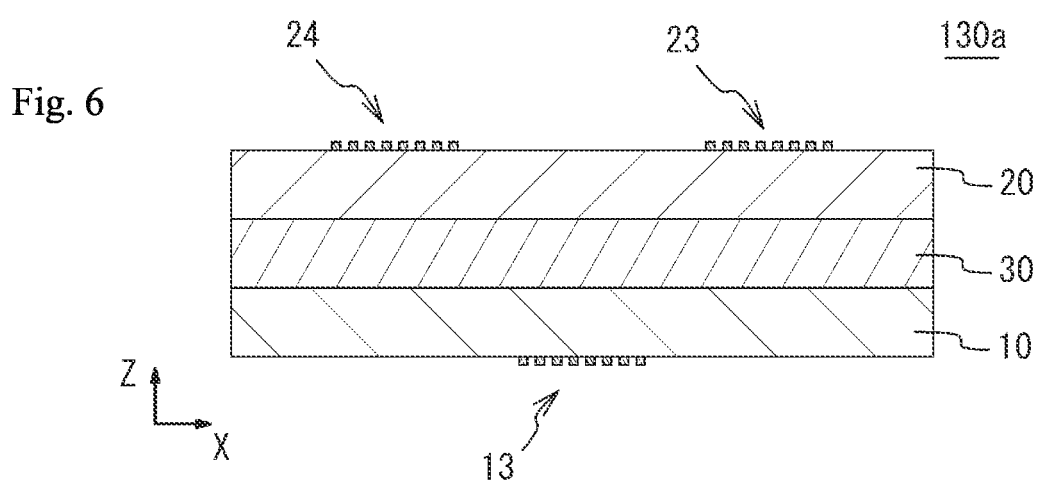
FIG. 6 is a cross-sectional view of a detecting device according to a second embodiment.

FIG. 6 is a cross-sectional view of a detecting device 130a according to a second embodiment. As shown in FIG. 6, a detecting device 130a is different from the detecting device 130 of FIG. 5B in that a spacer substrate 30 is held between the second principal surface of the first substrate 10 and the second principal surface of the second substrate 20. The spacer substrate 30 is a transparent substrate and is made of a material such as glass that contains synthetic silica and mobile alkali ions, for example.

The first substrate 10 and the spacer substrate 30 are brought into contact and bonded with each other, and the second substrate 20 and the spacer substrate 30 are brought into contact and bonded with each other, thereby obtaining the configuration of FIG. 6. In this case also, the method used for the bonding is room temperature bonding, diffusion bonding, or anodic bonding. Organic adhesive is not used for bonding in this case, either.

Also, in the detecting device 130a according to the present embodiment, the first substrate 10 and the second substrate 20 are aligned without using an organic adhesive. Accordingly, variations in the optical characteristics are suppressed. In addition, by adjusting the thickness of the spacer substrate 30, an optical distance between the scale grating of the first substrate 10 and the scale gratings of the second substrate 20 can be adjusted. Further, by controlling a refractive index of the spacer substrate 30, designing an optical path for the detecting device 130a becomes possible. In addition, compared to when a glass block is used instead of the first substrate 10, the second substrate 20, and the spacer substrate 30, an ordinary semiconductor manufacturing device can be used since the thickness of the substrate to be processed can be reduced, and also processing is only necessary for one side of the substrate, and therefore, mass and a processing device are less restricted.

Third Embodiment

Figure 7:
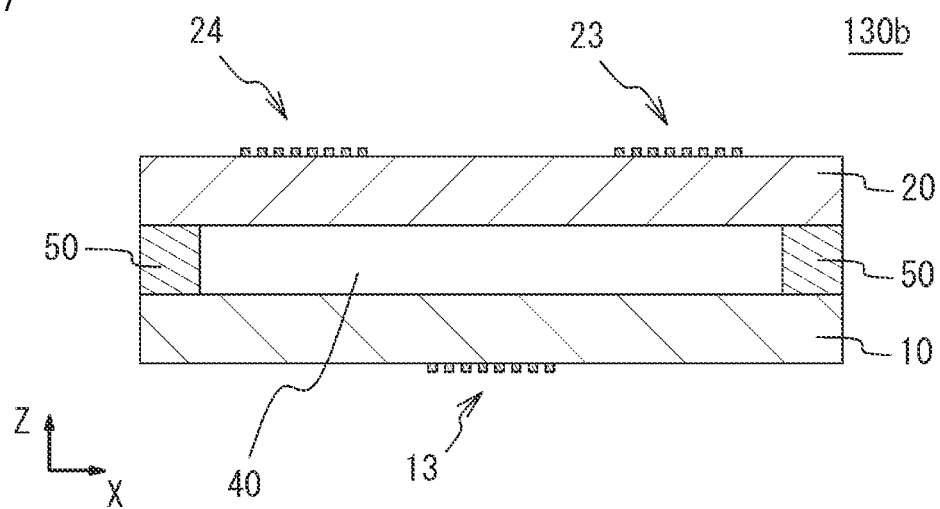
FIG. 7 is a cross-sectional view of a detecting device according to a third embodiment.

FIG. 7 is a cross-sectional view of a detecting device 130b according to a third embodiment. As shown in FIG. 7, the detecting device 130b is different from the detecting device 130 of FIG. 5B in that a cavity 40 is provided between the second principal surface of the first substrate 10 and the second principal surface of the second substrate 20. For example, by providing a spacer 50 between a peripheral portion of the second principal surface of the first substrate 10 and a peripheral portion of the second principal surface of the second substrate 20, the cavity 40 can be arranged between a region other than the peripheral portion of the second principal surface of the first substrate 10 and a region other than the peripheral portion of the second principal surface of the second substrate 20. The spacer 50 uses a material such as glass that contains synthetic silica and mobile alkali ions as a transparent member. Alternatively, since the cavity 40 is an optical path, and the spacer 50 can use Si or the like as a non-transparent member.

The first substrate 10 and the spacer 50 are brought into contact and bonded with each other, and the second substrate 20 and the spacer 50 are brought into contact and bonded with each other, thereby obtaining the configuration of FIG. 7. In this case also, the method used for the bonding is room temperature bonding, diffusion bonding, or anodic bonding. Organic adhesive is not used for bonding in this case, either.

In the detecting device 130b according to the present embodiment, the first substrate 10 and the second substrate 20 are aligned without using an organic adhesive. Accordingly, variations in the optical characteristics are suppressed. In addition, by adjusting the thickness of the spacer 50, an optical distance between the scale grating of the first substrate 10 and the scale gratings of the second substrate 20 can be adjusted. In addition, compared to when a glass block is used instead of the first substrate 10, the second substrate 20, and the spacer substrate 30, an ordinary semiconductor manufacturing device can be used since the cavity 40 is provided, the thickness of the substrate to be processed can be reduced, and processing is only necessary for one side of the substrate, and therefore, mass and a processing device are less restricted.

Fourth Embodiment

Figure 8:
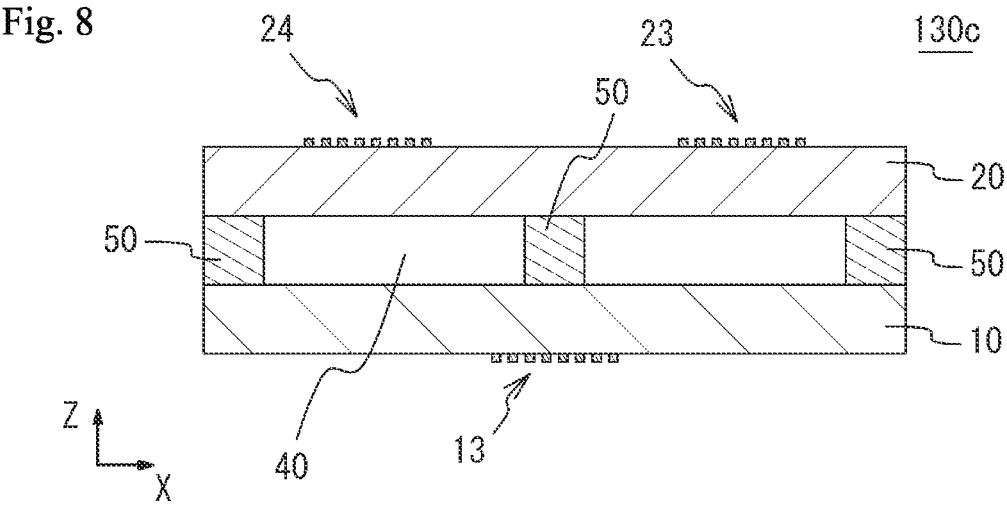
FIG. 8 is a cross-sectional view of a detecting device according to a fourth embodiment.

FIG. 8 is a cross-sectional view of a detecting device 130c according to a fourth embodiment. The detecting device 130c is different from the detecting device 130b of FIG. 7 because of a position of the spacer 50. As shown in FIG. 8, the spacer 50 may be arranged in a region other than the peripheral portion so long as the spacer 50 does not obstruct the optical path. For example, the spacer 50 may be further provided between a center portion of the second principal surface of the first substrate 10 and a center portion of the second principal surface of the second substrate 20. With this configuration, strength can be improved.

Fifth Embodiment

Figure 9:
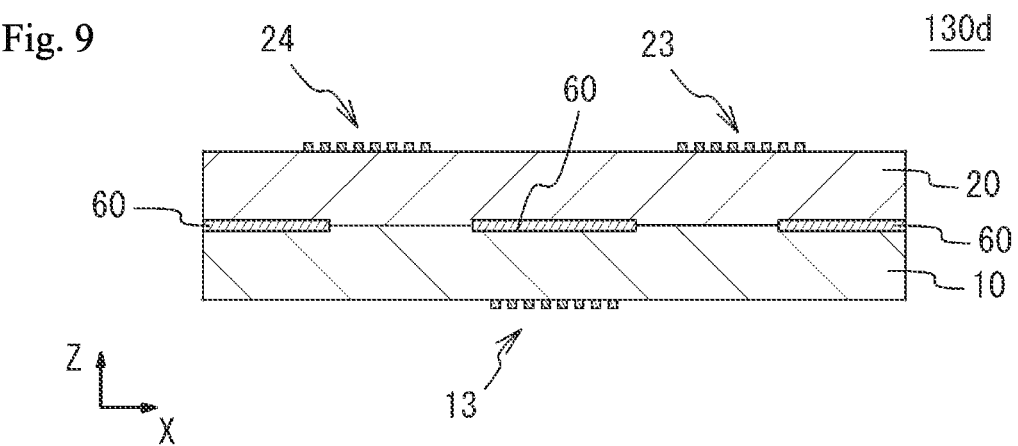
FIG. 9 is a cross-sectional view of a detecting device according to a fifth embodiment.

FIG. 9 is a cross-sectional view of a detecting device 130d according to a fifth embodiment. As shown in FIG. 9, the detecting device 130d is different from the detecting device 130 of FIG. 5B in that a thin film 60 is provided to serve as a light reflecting film or a light absorbing film at a surface portion where the second principal surface of the first substrate 10 and the second principal surface of the second substrate 20 are bonded to each other. When serving as a light reflecting film, the thin film 60 uses a material such as a metal like Al, Au, Ag, Cu, Cr, Ti, or Pt, a multilayer film thereof, or alloys like Ni—Cr. When serving as a light absorbing film, the thin film 60 uses a material such as diamond-like carbon (DLC), black plating, a Ti-based oxide, or a black-based paint. The thickness of the thin film 60 is, for example, tens of nanometers to hundreds of nanometers. Moreover, the thin film 60 serving as the light absorbing film refers to the amount of light absorbed by the thin film 60 per unit thickness being greater than the amount of light absorbed by the first substrate 10 and the second substrate 20 per unit thickness.

Since the thickness of the thin film 60 is small, the second principal surface of the first substrate 10 and the second principal surface of the second substrate 20 can be bonded even when the thin film 60 is provided. For example, by providing the thin film 60 in a path of stray light, effects from the stray light can be suppressed. Also, in the present embodiment, the first substrate 10 and the second substrate 20 can be bonded by room temperature bonding, diffusion bonding, or anodic bonding, without using an organic adhesive.

In the second embodiment, the thin film 60 of the present embodiment may be arranged at a portion of the bonded surface of the spacer substrate 30. In addition, in the third and fourth embodiments, the thin film 60 of the present embodiment may be arranged at a portion of the bonded surface of the spacer 50.

Sixth Embodiment

Figure 10:
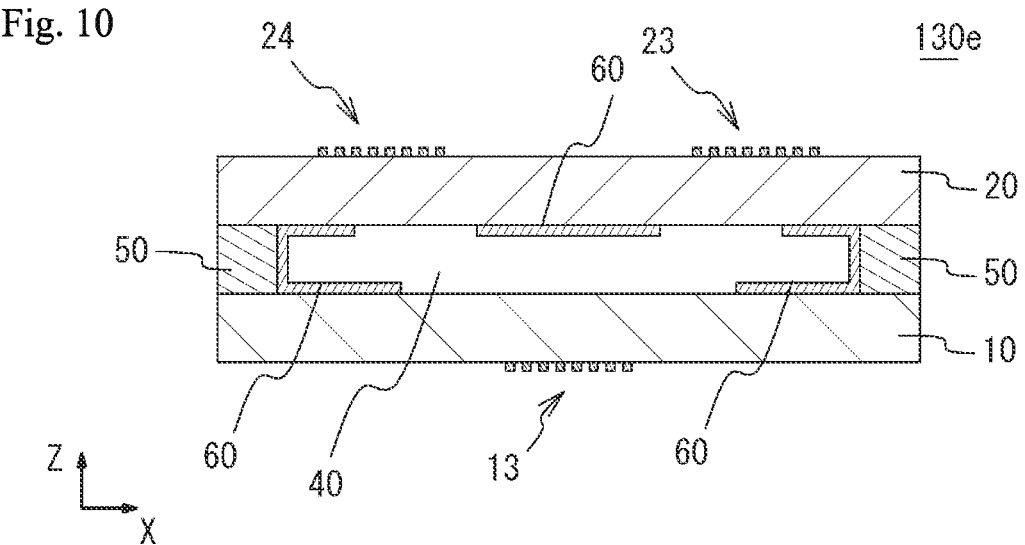
FIG. 10 is a cross-sectional view of a detecting device according to a sixth embodiment.

FIG. 10 is a cross-sectional view of a detecting device 130e according to a sixth embodiment. As shown in FIG. 10, the detecting device 130e is different from the detecting device 130b in FIG. 7 in that the thin film 60 is provided inside the cavity 40. According to the present embodiment, this enables the distance between the scale grating of the first substrate 10 and the scale grating of the second substrate 20 to be adjusted and can suppress effects due to the stray light.

Seventh Embodiment

Figure 11A:
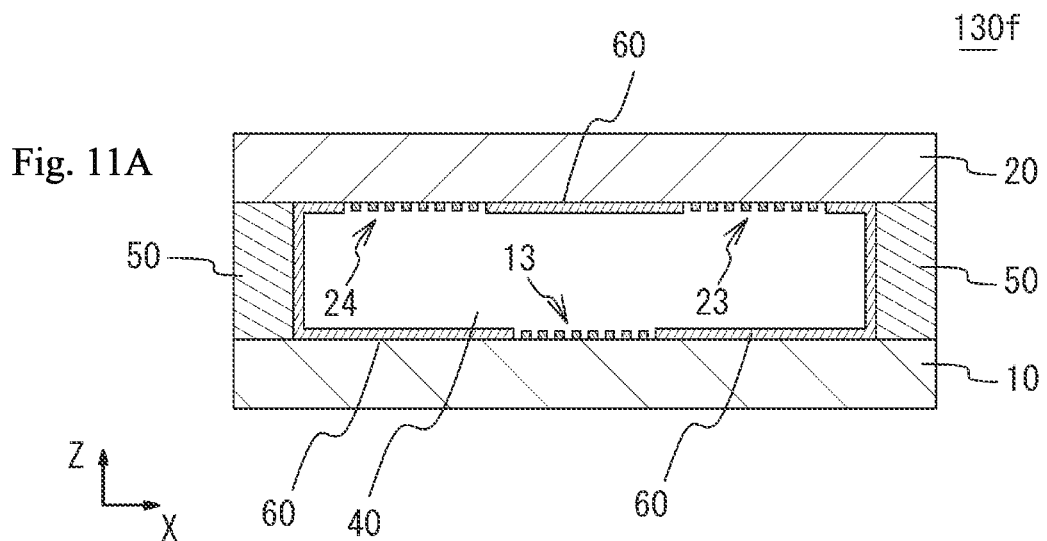
FIGS. 11A and 11B are exemplified views of a detecting device according to a seventh embodiment.
Figure 11B:
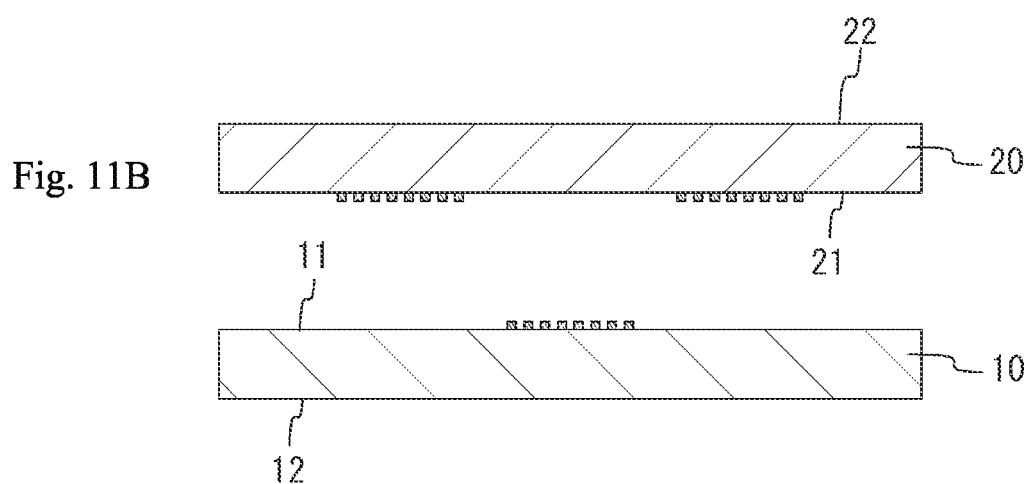

In a detecting device 130f according to the seventh embodiment, the scale grating is provided inside the cavity. As shown in FIG. 11A, for example, the detecting device 130f is different from the detecting device 130b of FIG. 7 in that the scale gratings are provided inside the cavity 40. For example, as shown in FIG. 11B, a first principal surface 11 of the first substrate 10 and a first principal surface 21 of the second substrate 20 face each other, and the spacer 50 may be positioned between the peripheral portion of the first principal surface 11 of the first substrate 10 and the peripheral portion of the first principal surface 21 of the second substrate 20. In this case, the scale grating 13, scale grating 23, and scale grating 24 can be arranged inside the cavity 40. With this configuration, the scale gratings are surrounded by the spacer 50 and therefore, the scale gratings can be protected, and contamination of the scale gratings can be controlled. Further, in this configuration, the thin film 60 may be provided inside the cavity 40. The thin film 60 may be arranged in a region where the scale grating 13, the scale grating 23, and the scale grating 24 are not provided. In addition, the thin film 60 may be provided at a portion of the bonded surface of the spacer 50.

Eighth Embodiment

Figure 12A:
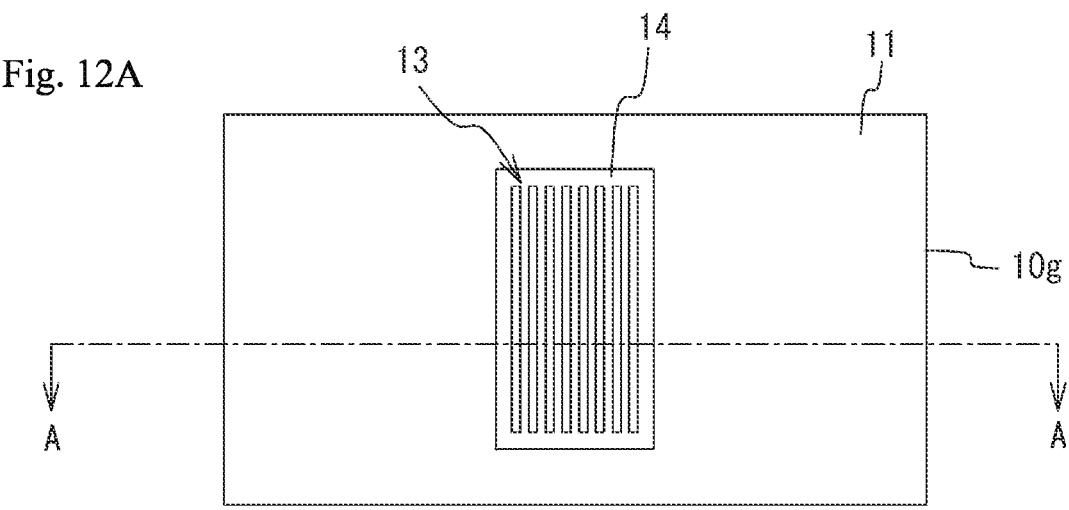
FIG. 12A is a plan view of the first substrate and FIG. 12B is a cross-sectional view along a line A-A of FIG. 12A.
Figure 12B:
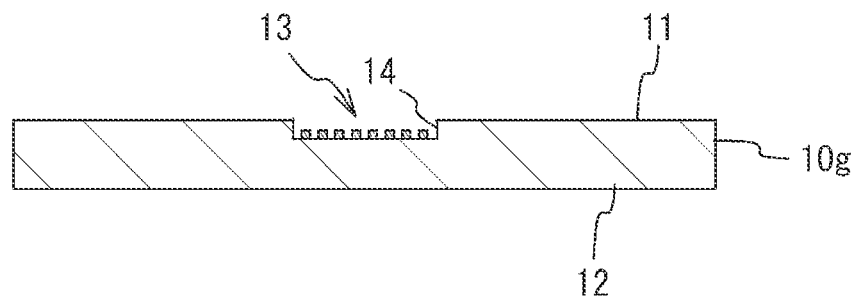

A detecting device 130g according to an eighth embodiment has a recess in the substrate and the scale grating is provided inside the recess. The detecting device 130g includes a first substrate 10g instead of the first substrate 10, and a second substrate 20g instead of the second substrate 20. FIG. 12A is a plan view of the first substrate 10g. FIG. 12B is a cross-sectional view of the first substrate 10g and shows a cross-sectional view along a line A-A of FIG. 12A. The first substrate 10g is made from the same material as the first substrate 10 according to the first embodiment. As shown in FIGS. 12A and 12B, a recess 14 is provided in the first principal surface 11 and the scale grating 13 is provided inside the recess 14.

Figure 13A:
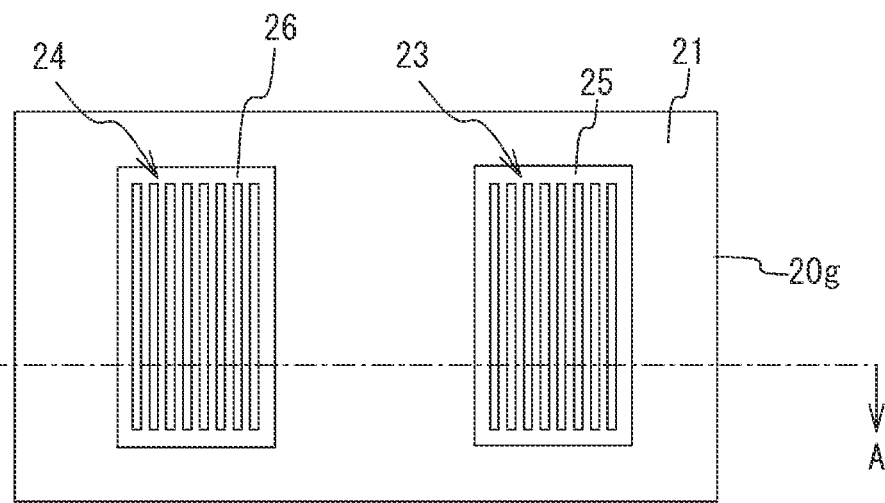
FIG. 13A is a plan view of the second substrate and FIG. 13B is a cross-sectional view along a line A-A of FIG. 13A.
Figure 13B:
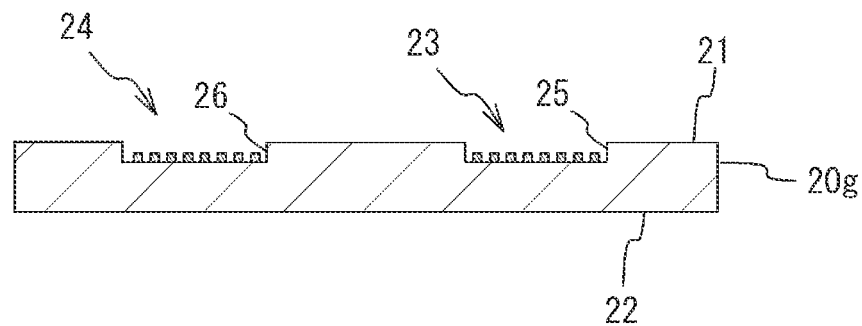

FIG. 13A is a plan view of the second substrate 20g. FIG. 13B is a cross-sectional view of the second substrate 20g and shows a cross-sectional view along a line A-A of FIG. 13A. The second substrate 20g is made from the same material as the second substrate 20 according to the first embodiment. As shown in FIGS. 13A and 13B, the first principal surface 21 is provided with a recess 25 and a recess 26. The scale grating 23 is provided inside the recess 25. The scale grating 24 is provided inside the recess 26.

Figure 14A:
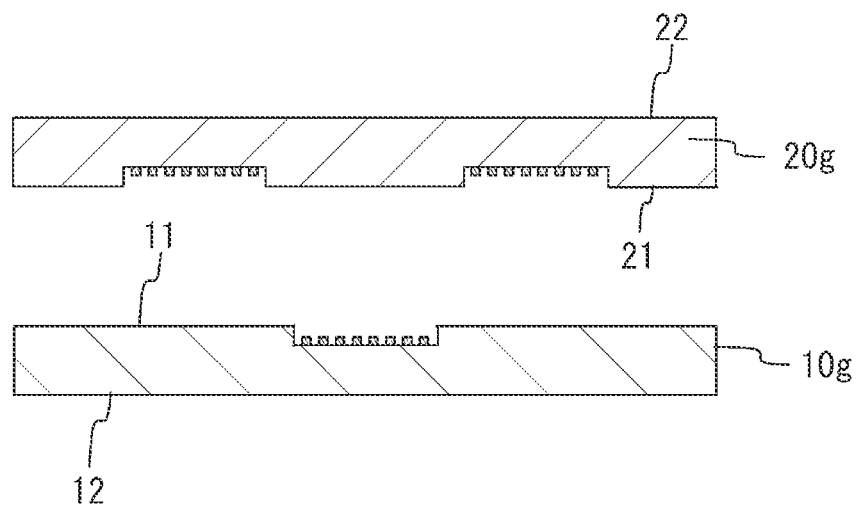
FIGS. 14A and 14B are exemplified views of a detecting device according to an eighth embodiment.
Figure 14B:
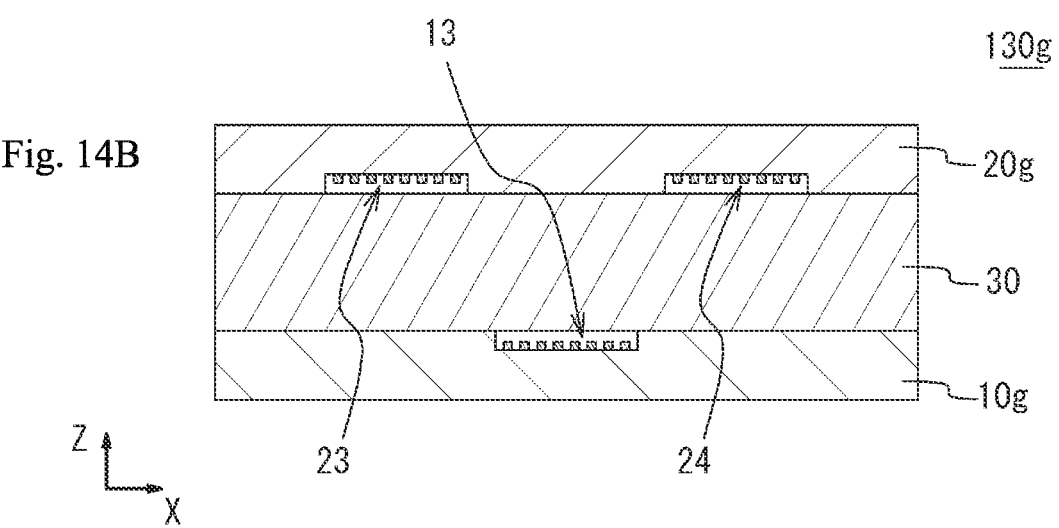

As shown in FIG. 14A, the first principal surface 11 of the first substrate 10g and the first principal surface 21 of the second substrate 20g face each other. As shown in FIG. 14B, the spacer substrate 30 is provided between the first principal surface 11 of the first substrate 10g and the first principal surface 21 of the second substrate 20g. In this case, the first substrate 10g and the spacer substrate 30 are brought into contact and bonded with each other such that the scale grating 13 is placed between the scale grating 23 and the scale grating 24 in a plan view, and the second substrate 20g and the spacer substrate 30 are brought into contact and bonded with each other. The method used for the bonding is room temperature bonding, diffusion bonding, or anodic bonding.

According to the present embodiment, the scale gratings are covered and protected by the spacer substrate 30 at the time of bonding, and therefore, effects from deformation of the scale gratings and the like can be suppressed. In addition, the thin film 60 may be arranged at a portion of the bonded surface of the spacer substrate 30.

Ninth Embodiment

A detecting device 130h according to a ninth embodiment includes a spacer having a recess provided on the surface of the spacer. The detecting device 130h includes a spacer substrate 30h instead of the spacer substrate 30. As shown in FIG. 15A, the spacer substrate 30h includes a recess 31 on the first principal surface, and recesses 32 and 33 on the second principal surface. As shown in FIG. 15B, the first substrate 10 and the second substrate 20 face each other and the spacer substrate 30h is arranged between the first substrate 10 and the second substrate 20. In this case, the scale grating 13 is arranged inside the recess 31, the scale grating 23 is arranged inside the recess 32, and the scale grating 24 is arranged inside the recess 33. Then, the first substrate 10 and the spacer substrate 30h are brought into contact and bonded with each other, and the second substrate 20 and the spacer substrate 30h are brought into contact and bonded with each other.

In the present embodiment also, the scale gratings are covered and protected by the recesses at the time of bonding, and therefore influences such as deformation of the scale grating can be suppressed.

In the various embodiments noted above, a plurality of detecting devices may be manufactured in bulk. For example, a plurality of detecting devices may be manufactured in bulk using micro-electro mechanical systems (MEMS) technology. For example, as shown in FIG. 16A, a substrate provided with a plurality of first substrates noted in each embodiment above and a substrate provided with a plurality of second substrates noted in each embodiment above are aligned and made to face each other. As shown in FIG. 16B, an individual detecting device can be obtained by cutting after the substrates are bonded together in bulk. This method enables high alignment accuracy to be achieved and also enables bulk manufacture of a plurality of detecting devices.

In the above, embodiments of the present invention are described in detail. However, the present invention is not limited to the specific embodiments noted above and various modifications and changes are possible within a scope of the present invention described in the scope of the claims.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A grating part comprising:
   a first transparent substrate having an optical grating on a surface thereof;
   a second transparent substrate having an optical grating on a surface thereof; and
   a spacer positioned between the first transparent substrate and the second transparent substrate, the spacer bonding the first transparent substrate and the second transparent substrate,
   wherein the optical grating on the surface of the first transparent substrate, and the optical grating on the surface of the second transparent substrate are provided in non-overlapping regions in a plan view,
   wherein a cavity is formed by the first substrate, the second substrate, and the spacer, and
   wherein the optical grating on the surface of the first transparent substrate, and the optical grating on the surface of the second transparent substrate are provided in the cavity.

2. The grating part according to claim 1, wherein the spacer includes the cavity between the first transparent substrate and the second transparent substrate.

3. The grating part according to claim 2, further comprising a film positioned inside the cavity and configured as one of a light reflecting film and a light absorbing film.

4. The grating part according to claim 1, wherein the first transparent substrate only includes optical grating on the surface.

5. The grating part according to claim 4, wherein the surface of the second transparent substrate only includes optical grating on the surface.

6. The grating part according to claim 1, further comprising a film positioned inside the cavity and configured as a light reflecting film.

7. The grating part according to claim 1, wherein all optical grating on the first transparent substrate and the second transparent substrate is provided in the cavity.

8. A manufacturing method of a grating part comprising:
   positioning a spacer between a first transparent substrate having an optical grating on a surface thereof and a second transparent substrate having an optical grating on a surface thereof; and
   bonding, with the spacer, the first transparent substrate and the second transparent substrate by any one of room temperature bonding, diffusion bonding, and anodic bonding,
   wherein the optical grating on the surface of the first transparent substrate, and the optical grating on the surface of the second transparent substrate are provided in non-overlapping regions in a plan view,
   wherein a cavity is formed by the first substrate, the second substrate, and the spacer, and
   wherein the optical grating on the surface of the first transparent substrate, and the optical grating on the surface of the second transparent substrate are provided in the cavity.

* * * * *